United States Patent
Wild

[11] Patent Number: 6,027,646
[45] Date of Patent: Feb. 22, 2000

[54] CANISTER OIL FILTER WITH IMPROVED FILTER SEALING

[75] Inventor: Jonathan T. Wild, Lafayette, Ind.

[73] Assignee: Caterpillar Inc., Peoria, Ill.

[21] Appl. No.: 09/055,723

[22] Filed: Apr. 6, 1998

[51] Int. Cl.⁷ .................................................. B01D 35/30
[52] U.S. Cl. ........................ 210/323.2; 210/444; 210/450; 210/453
[58] Field of Search ................................ 210/323.2, 352, 210/440, 443, 444, 450, 453, 455

[56] References Cited

U.S. PATENT DOCUMENTS

| | | | |
|---|---|---|---|
| 4,061,576 | 12/1977 | Hilgert et al. | 210/450 |
| 5,066,391 | 11/1991 | Faria | 210/450 |
| 5,462,679 | 10/1995 | Verdegan et al. | 210/798 |
| 5,468,386 | 11/1995 | Ardes | 210/248 |
| 5,548,893 | 8/1996 | Koelfgen | 29/888.011 |
| 5,552,040 | 9/1996 | Baehler et al. | 210/168 |
| 5,564,401 | 10/1996 | Dickson | 123/573 |
| 5,584,987 | 12/1996 | Mules | 210/130 |
| 5,623,755 | 4/1997 | Childress et al. | 29/426.5 |
| 5,681,466 | 10/1997 | Goldberg et al. | 210/350 |
| 5,690,816 | 11/1997 | Covington | 210/130 |

FOREIGN PATENT DOCUMENTS

| | | | |
|---|---|---|---|
| 1428424 | 1/1987 | U.S.S.R. | 210/440 |

*Primary Examiner*—Matthew O. Savage
*Attorney, Agent, or Firm*—Alan J. Hickman

[57] ABSTRACT

A canister oil filter for an internal combustion engine comprising a plurality of filter elements with seals on each end of each filter, the filters being stacked end to end within the tubular housing, an oil inlet and outlet disposed in one end of the canister and a spring biased retainer collar, which keeps pressure on all of the end seals, disposed in the same end of the canister as the oil inlet and outlet with the bias of the spring and the force from the impinging incoming oil acting generally in the same direction, to form a canister with improved filter sealing.

11 Claims, 3 Drawing Sheets

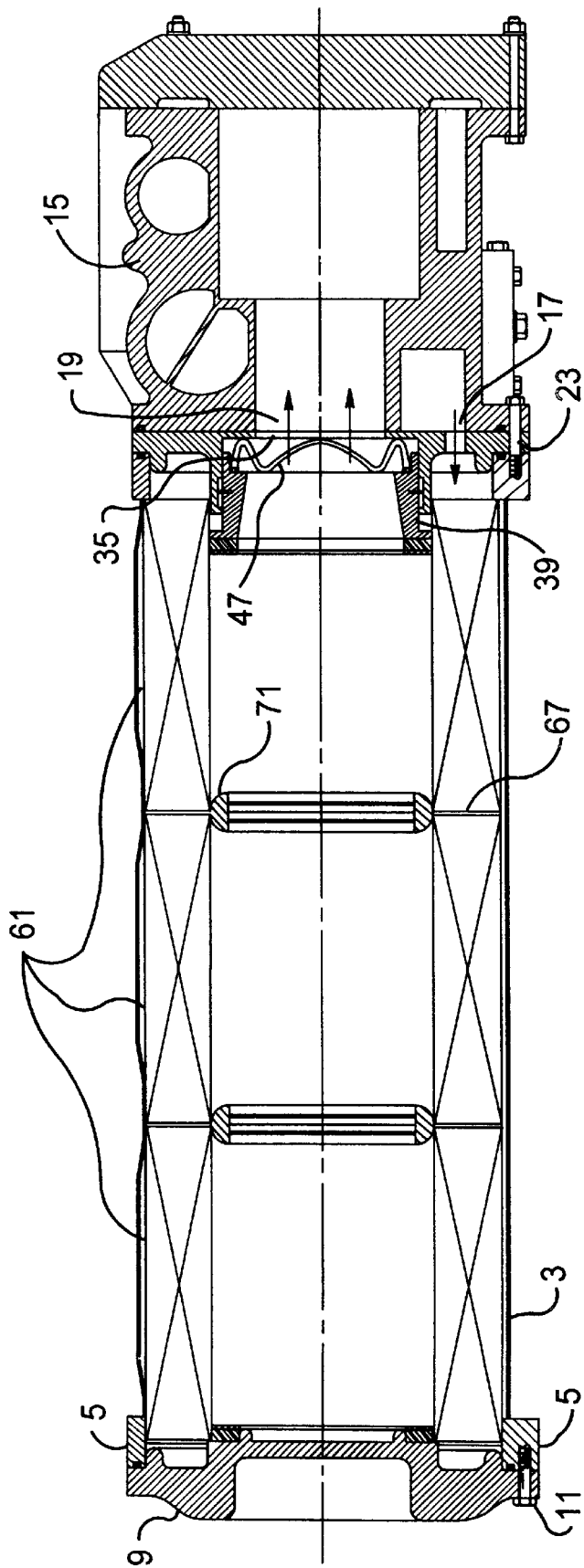
Fig. - 1 -

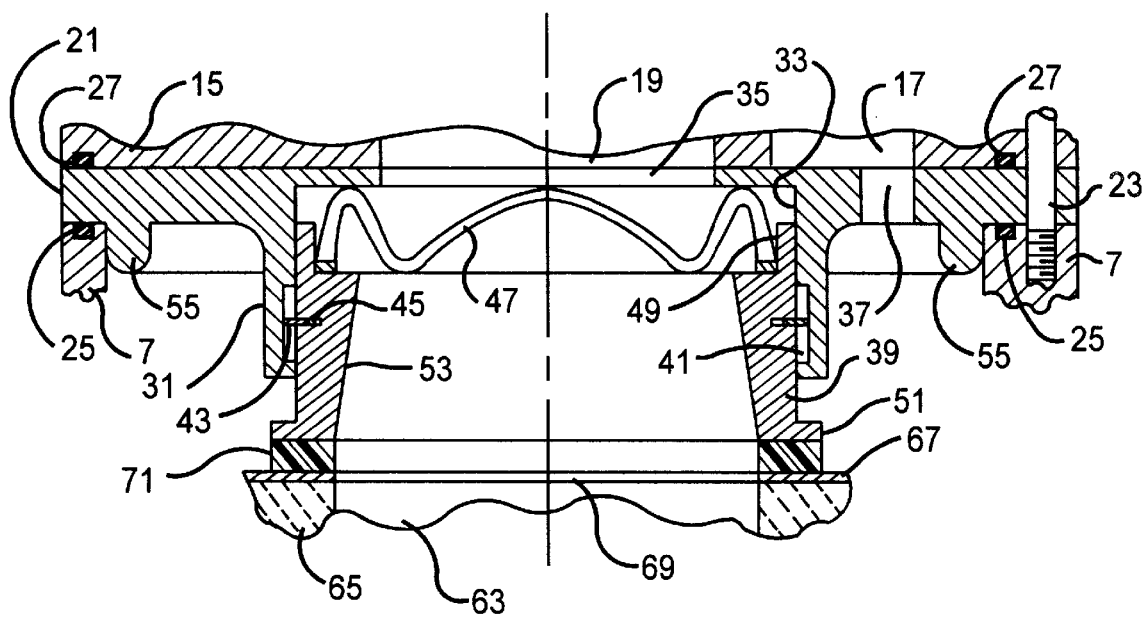
Fig. - 2 -

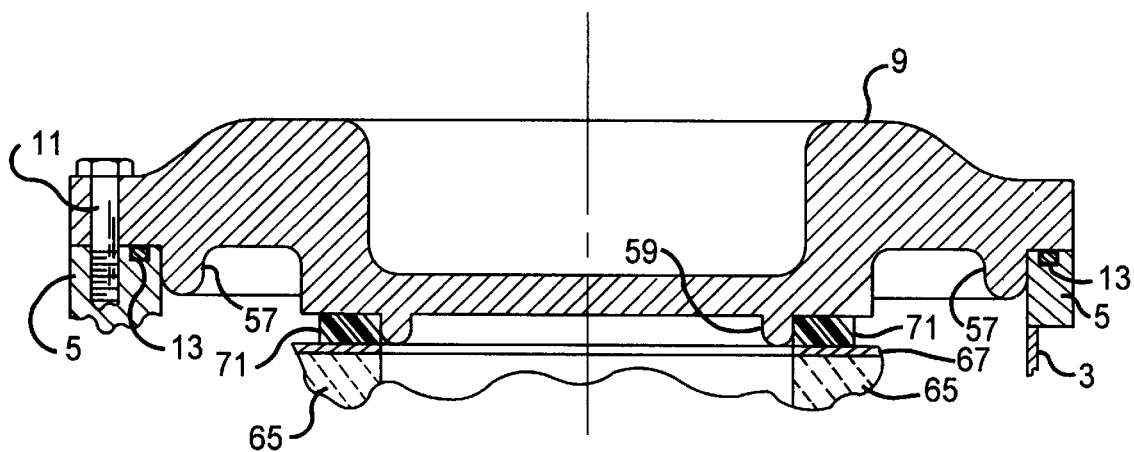
Fig. - 3 -

CANISTER OIL FILTER WITH IMPROVED FILTER SEALING

TECHNICAL FIELD

The invention relates to an oil filter for an internal combustion engine and more particularly to a sealing of a plurality of canister style filter elements stacked end to end.

BACKGROUND ART

Canister oil filters with a plurality of filter elements stacked end to end have been in use. Tolerances on the length of the filter elements resulted in a large variation in the overall length of the stack of elements in the canister so that a spring and retainer were placed in the cover of the canister forming the end opposite the oil inlet and outlet. The filter elements have an elastomer seal on each end, which is forced into engagement by the spring forcing the dirty oil to flow from the inlet through the filter elements before passing through the outlet into the engine. During engine start-up a spike of high pressure oil impinges on the face of the filter element adjacent the inlet potentially compressing the spring and allowing unfiltered oil to bypass the elements. U.S. Pat. No. 5,584,987 describes an oil filter assembly for an internal combustion engine in which the filter element is held in sealed engagement by a spring acting on the same end of the canister as the oil inlet and outlet.

DISCLOSURE OF THE INVENTION

Among the objects of this invention may be noted the provision of a canister oil filter which will accommodate stacks of filter elements of varying length and not be subject to leaking unfiltered oil to the outlet duct during start-up when high pressure spikes impinge upon the end of the filter elements.

In general, a canister oil filter for an internal combustion engine, when made in accordance with this invention comprises a tubular housing, a head having an inlet duct for incoming unfiltered oil and an outlet duct for filtered oil disposed on one end of the tubular housing and a removable cover disposed on the other end of the tubular housing. An adapter plate with a boss is disposed adjacent the head with the boss extending into the housing. The boss has a counterbore generally concentric with the axis of the tubular housing. An outlet port in the bottom of the counterbore registers with the outlet duct in the head and an inlet port disposed outboard of the boss registers with the inlet duct in the head. A retainer collar is slidably disposed in the counterbore, a groove is disposed in the counterbore and cooperates with a retaining ring extending from the retainer collar to capture the retainer collar within the counterbore and allow the retainer collar to slide back and forth in the counterbore. A spring biases the retainer collar away from the bottom of the counterbore. The removable cover has a fixed collar disposed concentric with the tubular housing. A plurality of cylindrical filter elements with a central opening, sealed ends and an elastomer seal on each end circumscribing the opening are disposed within the housing. The filter elements are stacked within the housing with the elastomer seals of adjacent filter elements abutting. The elastomer seal on the filter element adjacent the retainer collar abuts the retainer collar and the elastomer seal on the end of the filter element adjacent the cover fits over the fixed collar and abuts the cover. The length of the stack of filter elements is greater than the distance between the cover and the retainer collar, thereby compressing all of the elastomer seals and the spring. Whereby the unfiltered oil is forced to pass through the filter elements before reaching the outlet duct even when high pressure spikes during engine start-up cause surges of high pressure incoming oil to impinge on the filter element adjacent the inlet port as the bias of the spring and the force from the impinging incoming oil are generally in the same direction.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

FIG. 1 is an elevational view of a canister oil filter made in accordance with this invention;

FIG. 2 is an enlarged sectional view of an adapter plate and retainer collar disposed in the canister oil filter; and FIG. 3 is an enlarged sectional view of a removable cover.

BEST MODE FOR CARRYING OUT THE INVENTION

Referring now to the drawings in detail and in particular to FIGS. 1 and 2, there is shown a canister oil filter 1 for an internal combustion engine (not shown). The canister oil filter comprises a tubular housing 3 with a flange 5 and 7 on opposite ends. A removable cover 9 is fastened to the flange 5 on one end of the tubular housing 3 by bolts 11. An O-ring 13 or other sealing means seals the juncture of the cover 9 and flange 5. A head 15 having an inlet duct 17 for incoming unfiltered oil and an outlet duct 19 for filtered oil and an adapter plate 21 are fastened to the flange 7 by bolts 23. O-rings 25 and 27 or other sealing means seal the juncture of the flange 7, adapter plate 21 and head 15.

Referring now to FIG. 2 in detail the adapter plate 21 has a boss 31, which extends into the housing 3. The boss 31 has a counterbore 33 generally concentric with the axis of the tubular housing 3. An outlet port 35 is disposed in the adapter plate 21 in the bottom of the counterbore 33 and registers with the outlet duct 19 in the head 15. An inlet port 37 is disposed in the adapter plate 21 outboard of the boss 31 and registers with the inlet duct 17 in the head 15. A retainer collar 39 is slidably disposed in the counterbore 33 and has a close sliding fit therewith. A circular groove 41 is disposed in the counterbore 33 and cooperates with a split retainer ring 43 and a close fitting circular groove 45 in the retainer collar 39 to capture the retainer collar 39 within the counter bore 33 and allow the retainer collar 39 to slide back and forth in the counterbore 33. The close sliding fit between the counterbore 33 and the retainer collar 39 form a good seal therebetween. A wave shaped spring 47 or other biasing means disposed in the counterbore 33 biases the retainer collar 39 away from the bottom of the counterbore 33. One end of the retainer collar 39 has a counterbore 49 for receiving the wave shaped spring 47. The other end of the retainer collar 39 has a flange 51. The inner opening of the retainer collar 39 has a taper 53 which tapers slightly inward from the flange 51 to the counterbore 49. The adapter plate 21 has a depending ring 55, which is disposed to center the adapter plate 21 in the tubular housing 3 and to provide a sealing surface for the o-ring 25.

Referring now to FIG. 3 in detail, the removable cover 9 has a depending ring 57 disposed to center the cover 9 in the housing 3 and to provide a sealing surface for the o-ring 13 and a fixed collar 59 extending into the tubular housing 3 disposed concentric with the axis of the tubular housing 3.

O-ring 13 disposed in the flange 5 provides a seal when the cover 9 is fastened to the flange 5 by the bolts 11.

Referring back to FIGS. 1 and 2, a plurality of cylindrical filter elements 61 (three are shown) are stacked end to end in the canister oil filter 1. Each of the filter elements 61 have a central opening 63 surrounded by a filter medium 65. The ends are sealed by a plate 67 having a port 69, which registers with and forms part of the central opening 63. An elastomer seal 71 circumscribes the opening 63 on each end of the filter element 61. The filter elements 61 are stacked within the housing 3 with the elastomer seals 71 abutting. The elastomer seal 71 on one end of the stack of filter elements abuts the flange 51 of the retainer collar 39 and the elastomer seal 71 on the other end of the stack of filter elements 61 fits over the fixed collar 59 and abuts the removable cover 9. The length of the stack varies due to the tolerances on the length of the individual elements but is always greater than the distance between the removable cover 9 and the flange 51 on the retainer collar 39 thereby compressing the elastomer seals 71 and the wave shaped spring 47. Whereby the unfiltered oil is forced to pass through the filter medium 65 before reaching the outlet duct 19 even when the high pressure spikes during engine start-up cause surges of high pressure oil to impinge on the filter element adjacent the inlet port as the bias of the spring 47 and the force from the impinging incoming oil are generally in the same direction. So no unfiltered oil bypasses the filter elements.

While the preferred embodiments described herein set forth the best mode to practice this invention presently contemplated by the inventor, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

Industrial Applicability

A canister oil filter for an internal combustion engine, when made in accordance with this invention advantageously prevents any unfiltered oil from bypassing the filter elements even during engine start-up when high pressure spikes cause surges of high pressure incoming oil to impinge on the filter elements as the force thus created adds to the sealing bias of the spring.

What is claimed is:

1. A canister oil filter for an internal combustion engine comprising a tubular housing having a central axis, a head having an inlet duct for incoming unfiltered oil and an outlet duct for filtered oil disposed on an upper end of the tubular housing and a removable cover disposed on a lower end of the tubular housing, an adapter plate with a boss disposed adjacent the head with the boss extending into the housing, the boss having a counterbore generally concentric with the axis of the tubular housing, an outlet port disposed in a bottom portion of the counterbore registering with the outlet duct in the head and an inlet port disposed outside of the boss registering with the inlet duct in the head, a retainer collar slidably disposed in the counterbore, a groove is disposed in the counterbore and cooperates with a retaining ring extending from the retainer collar to capture the retainer collar within the counterbore and allow the retainer collar to slide back and forth in the counterbore, a spring disposed in the counterbore biases the retainer collar away from the bottom portion of the counterbore, the cover having a fixed collar disposed concentric with the tubular housing, a plurality of cylindrical filter elements having sealed ends with a central opening in each sealed end and an elastomer seal circumscribing each of the central opening, the filter elements being stacked within the housing with the elastomer seals of adjacent filter elements abutting, the elastomer seal on the filter element adjacent the retainer collar abuts the retainer collar, the elastomer seal on the end of the filter element adjacent the cover fits over the fixed collar and abuts the cover, the stack of filter elements having a length that is greater than a distance between the cover and the retainer collar thereby compressing all of the elastomer seals and the spring and forcing the unfiltered oil to pass through the filter elements before reaching the outlet duct even when high pressure spikes during engine start-up cause surges of high pressure incoming oil to impinge on the filter element adjacent the inlet port as the bias of the spring on the retainer collar and the force from the impinging incoming oil are generally in the same direction.

2. The oil filter canister as set forth in claim 1, wherein the spring is wave shaped.

3. The oil filter canister as set forth in claim 2, wherein the retainer collar is counterbored to receive the spring.

4. The oil filter canister as set forth in claim 3, wherein the retainer collar has a flange on a lower end thereof, wherein said flange abuts the elastomer seal on the filter element.

5. The oil filter canister as set forth in claim 4, wherein the inner opening of the retainer collar tapers inwardly from the flange end to the counterbore.

6. The oil filter canister as set forth in claim 1, wherein the groove in the counterbore is circular.

7. The oil filter canister as set forth in claim 6, further comprising a circular groove in the retainer collar and the retaining ring being a split retainer ring disposed in the groove in the retainer collar to retain the retainer collar in the counterbore in the boss on the adapter plate.

8. The oil filter canister as set forth in claim 7, wherein the spring is wave shaped, the retainer collar is counterbored at one end to receive the spring and has a flange at another end.

9. The oil filter canister as set forth in claim 8, wherein the inner opening of the retainer collar tapers inwardly from the flange end to the counterbored end.

10. The oil filter canister as set forth in claim 1, wherein the adapter plate has a depending ring disposed to center the adapter plate in the tubular housing.

11. The oil filter canister as set forth in claim 1, wherein the fit between the counterbore in boss of the adapter plate and the retainer collar is a close sliding fit that acts as a seal between unfiltered and filtered oil.

* * * * *